Figure 1:
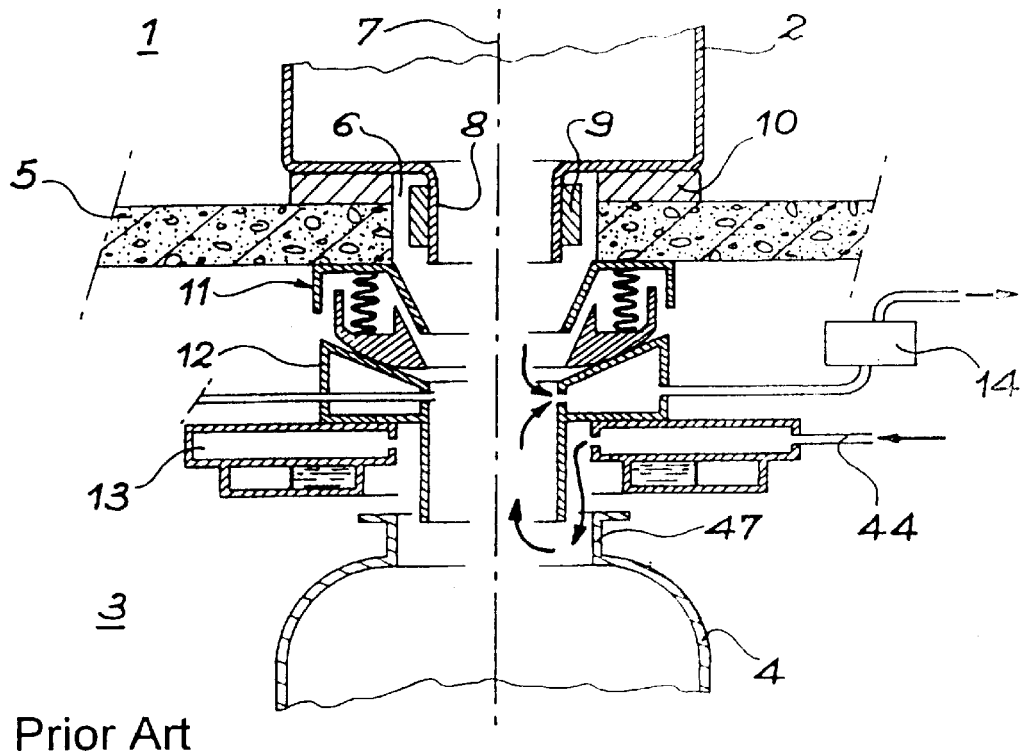

United States Patent [19]
Bernard et al.

[11] Patent Number: 5,820,652
[45] Date of Patent: Oct. 13, 1998

[54] SEALING SYSTEM FOR THE ENGAGEMENT OF A CONTAINER BENEATH A MELTING FURNACE

[75] Inventors: Claude Bernard, Chevreuse; Patrice Roux, Paris; Jacques Dollfus, Les Essants le Ra; François Meline, Paris, all of France

[73] Assignee: Compagnie Generale Des Matieres Nucleaires, Velizy-Villacoublay, France

[21] Appl. No.: 765,290

[22] PCT Filed: Jun. 13, 1996

[86] PCT No.: PCT/FR96/00903

§ 371 Date: Jan. 10, 1997

§ 102(e) Date: Jan. 10, 1997

[87] PCT Pub. No.: WO97/00522

PCT Pub. Date: Jan. 3, 1997

[30] Foreign Application Priority Data

Jun. 14, 1995 [FR] France .................................. 95 07078

[51] Int. Cl.⁶ ...................................................... C03B 5/26
[52] U.S. Cl. .................... 65/325; 65/122; 65/126; 65/329; 588/11; 588/252; 588/900; 376/272; 222/603
[58] Field of Search .............................. 65/122, 124, 126, 65/128, 130, 325, 327, 329; 588/11, 252, 900; 376/272; 22/603

[56] References Cited

U.S. PATENT DOCUMENTS 1,789,480  1/1931  Soubier ..................................... 65/209
4,643,869  2/1987  Heimerl et al. .......................... 376/272
4,666,494  5/1987  Stritzke et al. ............................ 65/32.2
4,690,781  9/1987  Heimerl et al. ............................ 588/11
4,980,091  12/1990 Joutel ....................................... 252/629
5,114,456  5/1992  Weisenburger et al. .................. 65/327

FOREIGN PATENT DOCUMENTS 1584761   1/1970   France .
2548819   1/1985   France .
2616000   12/1988  France .
3440260   4/1986   Germany .
4005748   8/1991   Germany .
1215265   12/1970  United Kingdom .

Primary Examiner—Stanley S. Silverman
Assistant Examiner—Sean Vincent
Attorney, Agent, or Firm—Pearne, Gordon, McCoy & Granger LLP

[57] ABSTRACT

A sealing system for the engagement of a container (24) beneath a melting pot containing a molten material, comprising a shell (30) surrounding a nozzle (40), the nozzle being located in the axis of the neck of the container and permitting the pouring of the material from the melting pot into the container. The shell (30) has tight connection means with the nozzle (40), a base (32) having a bearing surface for the reception of a corresponding bearing surface on the container neck and at least one bellows (33, 34) surrounding the nozzle and connecting the tight connection means to said base, the bellows being able to render the shell retractable along the nozzle axis, means for introducing a gas flow between said bearing surfaces being provided in order to permit the circulation of part of said flow towards the nozzle.

7 Claims, 2 Drawing Sheets

SEALING SYSTEM FOR THE ENGAGEMENT OF A CONTAINER BENEATH A MELTING FURNACE

The present invention relates to a sealing system for the engagement of a container beneath a melting furnace. It more particularly applies to the pouring of molten radioactive glass into a container.

The reprocessing of nuclear fuels permits the separation of uranium, plutonium and fission products present in the fuel elements which have spent a time in a reactor.

A process has been developed which is known as vitrification for the inclusion of a certain number of radioactive elements and in particular fission products in a vitreous matrix.

The melting furnace is constituted by a metal container, known as a melting pot and which is heated by induction. Melting takes place at the same time in the melting pot of a glass frit and calcinates of fission products in order to obtain a glass, which is poured into stainless steel containers.

This process has become necessary because it permits the storage over a long period and with very great safety of highly radioactive products.

This operating procedure is widely used, described and demonstrated, particularly at the Marcoule nuclear centre (vitrification works) and more recently in reprocessing plants in La Hague.

In a more general manner, the installation has two levels separated by a slab. At the upper level the melting pot is placed in a furnace. At the lower level the container is positioned vertically with respect to the tapping hole of the pot. An opening in the slab permits pouring or tapping.

The installation must make it possible to strictly confine the molten glass, so that there is no spread of radioactivity, particularly at the time of pouring, into the ambient air and onto the outer wall of the container. It must permit the collection of all the gases, dust and particles given off. It must also permit the expansion of the container under the effect of the temperature rise occurring between the instant when the container is empty and the instant when it is filled with very hot glass.

To this end FR-A-2 616 000 proposed an apparatus permitting the pouring of molten radioactive glass into a container. This apparatus has a static or material seal between the various elements of the apparatus and a dynamic confinement by the extraction of air or gas around the molten glass being poured or tapped. This apparatus, shown in FIG. 1, leaves between the container neck and the pouring nozzle, an annular area opening onto the outside and by which the tapping gases and dust can leak to the outside. This leak is in principle fought by an air extraction. However, if said air extraction is not sufficiently effective, there can be a leak of radioactive dust and gases to the outside contaminating the outer wall of the container. The dynamic sealing apparatus according to the present invention obviates this disadvantage.

Thus, the present invention relates to a dynamic sealing apparatus for the engagement of a container beneath a melting pot containing a molten material, comprising a shell surrounding a nozzle, the nozzle being located in the axis of the container neck and permitting the pouring of material from the melting pot into the container, characterized in that the shell comprises means for tight connection to the nozzle, a base having a bearing surface for receiving a corresponding bearing surface on the container neck, and at least one bellows surrounding the nozzle and connecting the tight connection means to said base, the bellows making it possible to retract the shell along the axis of the nozzle, means for introducing a gas flow between said bearing surfaces being provided in order to permit the circulation of part of said flow towards the nozzle.

The gas flow introduction means can include at least one groove forming a labyrinth seal. Advantageously, the pressure drop in the leakage flow to the nozzle creates in the labyrinth seal an overpressure opposing the leakage to the outside of tapping gases.

The invention will be better understood and other advantages and features will become more clear from reading the following non-limitative description with reference to the attached drawings, wherein show:

FIG. 1 A vertical sectional view along the pouring axis of an apparatus permitting the pouring of molten radioactive glass into a container, according to the prior art.

Figure 2:
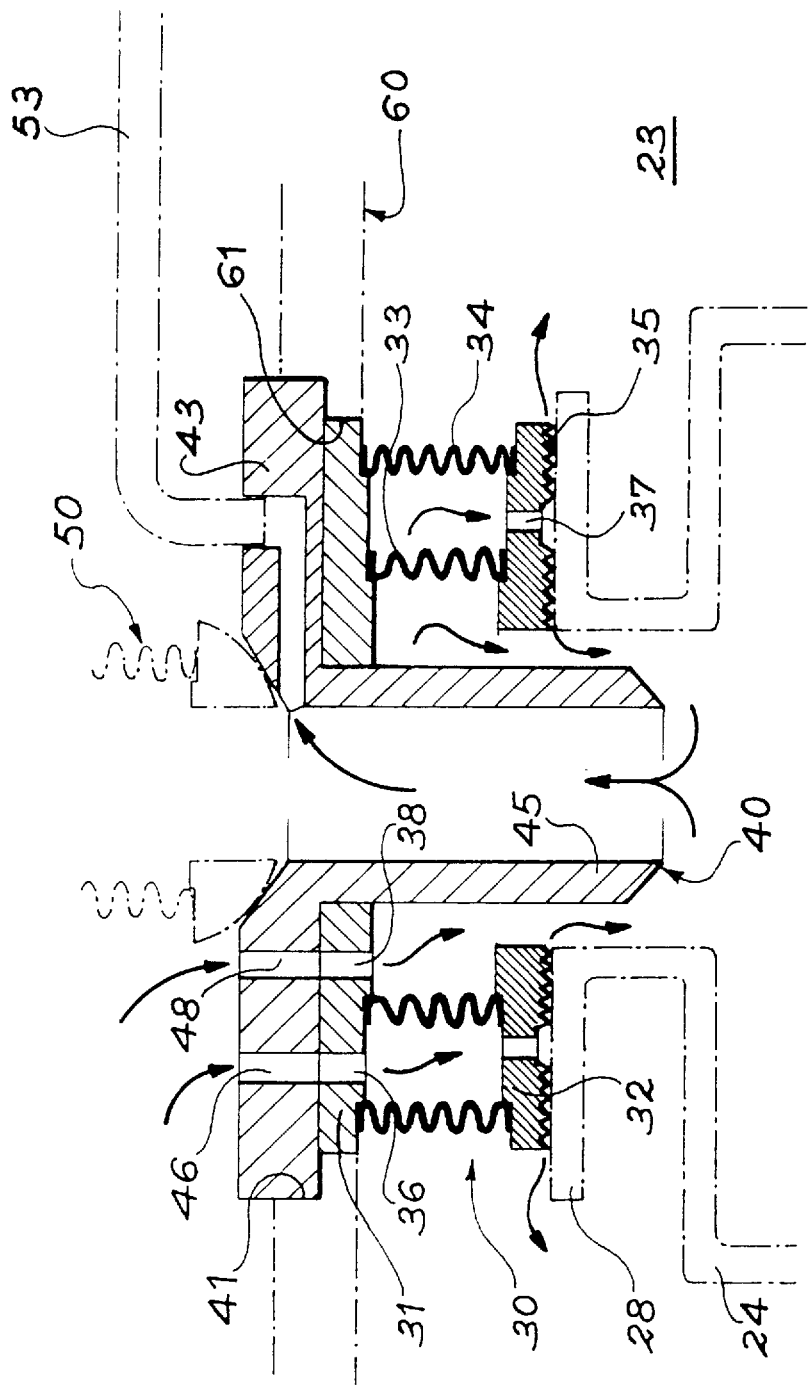

FIG. 2 In the same sectional view as in FIG. 1, a dynamic sealing system for the engagement of a container beneath a melting pot according to a first variant of the invention.

Figure 3:
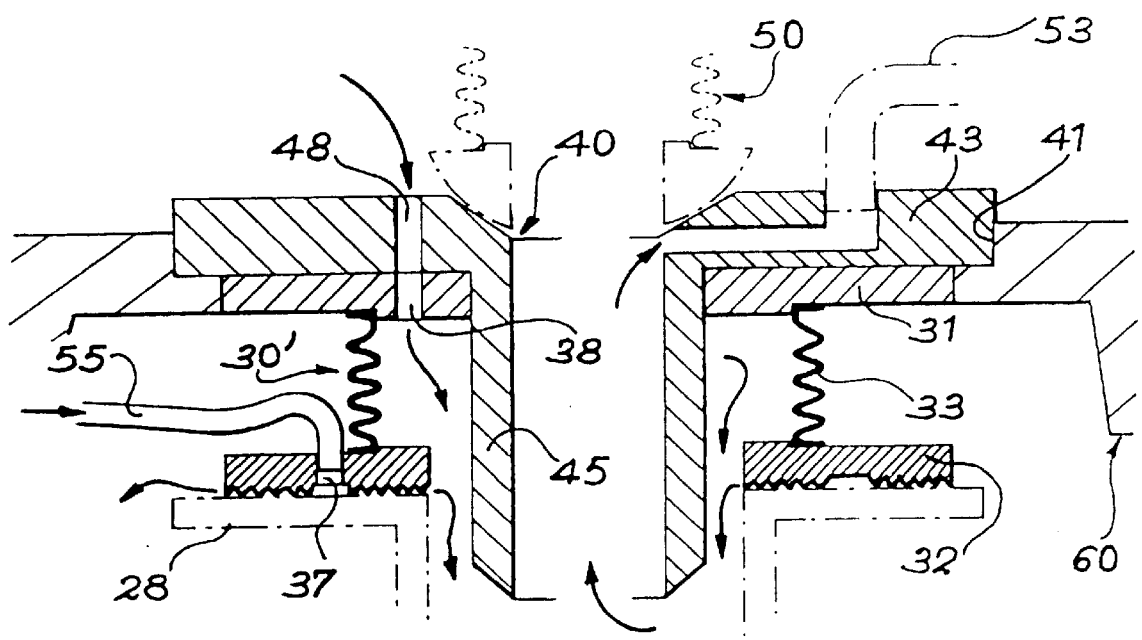

FIG. 3 In the same sectional view as in FIG. 1, a dynamic sealing system for the engagement of a container beneath a melting pot according to a second variant of the invention.

FIG. 1 illustrates the prior art, as disclosed by FR-A-2 616 000. It permits the transfer of molten glass between two superimposed cells separated by a dismantlable dome 13. The upper or vitrification cell 1 contains the melting pot 2. The lower or pouring cell 3 contains the container 4 in which it is wished to pour the molten radioactive glass coming from said melting pot. A horizontal concrete slab 5 beneath the melting pot has an opening 6. The complete melting pot 2, opening 6 and container 4 is organized about a vertical axis 7 known as the pouring axis.

The radioactive glass is in the liquid state in the melting pot 2 and is kept in the latter by set glass obstructing the pot neck 8. An inductor 9 is placed around the neck so that, at the chosen instant, it softens the set glass forming a plug, so as to enable the molten glass contained in the melting pot to flow out through the neck. The inductor 9 is connected by not shown connections to a medium frequency energy source permitting the heating of the neck 8 and the set glass. An insulating plate 10 insulates the melting pot 2 with respect to the concrete slab 5.

Beneath the concrete slab, to the right of the slab opening 6, is positioned the casting apparatus which is successively constituted from top to bottom by a retractable shell 11, a dismantlable shell 12 and the dismantlable dome 13.

The retractable shell 11 is formed by two interpenetrating boxes or cans, which slide in one another, the lower can entering the upper can. The two cans are interconnected by a metal bellows integral therewith. A not shown linkage system makes it possible to move the two cans together and the retractable shell is fixed by its upper can beneath the concrete slab.

The dismantlable shell 12 is fitted to the lower face of the retractable shell 11. It is put into place and retained by using the dismantlable dome 13. It is connected to a tapping gas suction system 14. The central part of the dismantlable shell is extended downwards in order to form a molten glass discharge nozzle.

The dismantlable dome is traversed by an internal chamber forming a coil for receiving a circulation of water for the cooling thereof. It also has a second chamber provided with a tube 44 permitting the entry of air into said chamber.

This apparatus ensures the sealing between the melting pot 2 and the bottom of the dismantlable shell 12. However, between the neck 47 of the container 4, the dismantlable shell 12 and the dismantlable dome 13 there is an annular area by which the tapping gases and dust can diffuse to the outside. If the air suction by the suction system 14 is not sufficiently effective, there can be a leakage of gases and dust at this location.

FIG. 2 shows a container 24 in the pouring cell 23. In diagrammatic manner is shown the lower part of the retractable shell 50 and the dismantlable dome 60.

In this application example of the invention, the nozzle 40 is a metal part revolving about an axis along which pouring or tapping takes place. Its upper part is constituted by a disk 43, which rests on a shoulder 41 of the central orifice 61 of the dismantlable dome 60 and which is extended by a tube 45. The not shown melting pot has a pouring tube communicating with the nozzle 40 by the duct constituted by the retractable shell 50.

The upper orifice of the nozzle 40 is widened in truncated cone-shaped manner in order to receive the lower face of the retractable shell 50. The contacting of the spherical cap portion forming the lower face of the retractable shell 50 with the truncated cone of the upper orifice of the nozzle prevents leaks with the vitrification cell.

According to the invention, the tube 45 of the nozzle 40 is surrounded by a shell 30 formed by an upper disk 31, a lower disk 32 and two bellows concentric to the nozzle, namely an inner bellows 33 and an outer bellows 34.

The shell 30 is tightly connected to the nozzle 40 by fixing the upper disk 31 beneath the nozzle disk 43. Thus, the upper disk 31 is located in the hole 61.

The lower disk 32 surrounds the nozzle tube 45 with a certain clearance. The lower face of said disk 32 is contacted with the rim 28 of the neck of the container 24, contacting occurring along a plane. The lower face of the disk 32 is grooved in order to form a labyrinth seal 35 extending over the entire surface of said face.

The blowing in of gas, e.g. air, takes place by means of various holes made in the disk 43 of the nozzle 40, in the upper disk 31 and in the lower disk 32 of the shell. As shown in FIG. 2, the hole 46 of the disk 43 communicates with the hole 36 of the disk 31, said hole 36 issuing into the annular space between the bellows 33 and 34. At least one hole 37 made in the lower disk 32 roughly midway between the internal radius and the external radius of the disk and between the two bellows 33 and 34, communicates with the groove or grooves forming the labyrinth seal 35. Compressed air blown in from the hole 46 then circulates between the two bellows 33, 34, passes through the hole 37 of the lower disk 32 and arrives at the labyrinth seal 35. Part of the blown in air flow is directed towards the pouring axis and rises via the interior of the nozzle where it is extracted with the pouring or tapping gases by means of the duct 35 connected to the nozzle 40 and to a gas extraction apparatus. The other part of the air flow escapes to the outside. There is a slight overpressure due to the pressure drops in the labyrinth seal within the annular chamber and the flow is distributed so as to prevent any leak to the outside of the tapping gases.

Compressed air (or some other scavenging gas) can also be blown in between the inner bellows 33 and the nozzle in order to prevent any contamination rise in this area. As shown in FIG. 2, the hole 48 made in the nozzle disk 43 close to the tube 45, permits the injection of said compressed air. It communicates with the hole 38 made in the upper disk 31 of the shell 30. The blown in air then passes into the annular area located between the inner bellows 33 and the nozzle, after which it penetrates the neck of the container 34 as a result of the clearance existing between the lower disk 32 of the shell and the tube 45 of the nozzle.

The tapping gases, the air blown in for supplying the labyrinth seal and possibly the scavenging air around the nozzle 40 are sucked in by means of the duct 53, filtered and then treated by an appropriate equipment.

According to the variant of FIG. 3, the shell 30' only has a single bellows, the inner bellows 33. The air blown in on the bearing plane between the lower disk 32 and the rim 28 of the neck of the container 24 is then supplied by a flexible pipe 55 connected to the hole 37 made in the lower disk 32.

Thus, the sealing system according to the invention effectively fulfils the three following functions:

formation of a bearing surface of the container beneath the melting pot, dynamic sealing at the bearing area of the container, extraction of the tapping or pouring gases to the gas treatment unit.

We claim:

1. Sealing system for the engagement of a container beneath a melting pot containing a molten material, comprising a shell surrounding a nozzle, the nozzle being located in the axis of the container neck and permitting the pouring of material from the melting pot into the container, wherein the shell has tight connection means with the nozzle, a base having a bearing surface for the reception of a corresponding bearing surface on the container neck, and at least one bellows surrounding the nozzle and connecting the tight connection means to said base, the bellows making it possible to retract the shell along the axis of the nozzle, means for the introduction of a gas flow between said bearing surfaces being provided in order to permit the circulation of part of said flow to the nozzle.

2. Sealing system according to claim 1, wherein the gas flow introduction means comprise at least one groove forming a labyrinth seal.

3. Sealing system according to claim 1, wherein the gas flow introduction means comprise at least one hole formed through the base for the supply of the gas flow.

4. Sealing system according to claim 1, wherein the tight connection means has a disk surrounding the nozzle.

5. Sealing system according to claim 3, wherein the shell only has a single bellows, so that the gas flow is supplied by a flexible pipe connected to a hole formed through the base.

6. Sealing system according to claim 3, wherein the shell has two concentric bellows, so that the gas flow is supplied by passing between the two bellows.

7. Sealing system according to any one of the claims 1 to 6 comprising means for injecting a second gas flow between the nozzle and the neighbouring bellows, making it possible to scavenge the space between the nozzle and the container neck.

* * * * *